United States Patent [19]
Willis et al.

[11] Patent Number: 4,992,874
[45] Date of Patent: Feb. 12, 1991

[54] METHOD AND APPARATUS FOR CORRECTING TIMING ERRORS AS FOR A MULTI-PICTURE DISPLAY

[75] Inventors: Donald H. Willis; Barth A. Canfield, both of Indianapolis, Ind.

[73] Assignee: RCA Licensing Corporation, Princeton, N.J.

[21] Appl. No.: 375,113

[22] Filed: Jul. 3, 1989

[51] Int. Cl.5 .................... H04N 5/262; H04N 5/272; H04N 9/74; H04N 9/45
[52] U.S. Cl. .................................... 358/183; 358/19; 358/22
[58] Field of Search ................. 358/183, 377, 19

[56] References Cited

U.S. PATENT DOCUMENTS

| | | |
|---|---|---|
| 3,911,368 | 10/1975 | Tarczy et al. |
| 4,249,211 | 2/1981 | Baba et al. |
| 4,595,953 | 6/1986 | Willis |
| 4,617,679 | 10/1986 | Brooks ............... 307/262 |
| 4,623,925 | 11/1986 | Tults |
| 4,638,360 | 1/1987 | Christopher et al. ........ 358/148 |
| 4,649,438 | 3/1987 | Shimizu et al. .............. 358/337 |
| 4,722,007 | 1/1988 | Fling |
| 4,814,879 | 3/1989 | McNeely |
| 4,821,086 | 4/1989 | McNeely et al. ............. 358/183 |
| 4,914,509 | 4/1990 | Idei ............................ 358/183 |

Primary Examiner—Howard W. Britton
Assistant Examiner—Wendy R. Greening
Attorney, Agent, or Firm—Joseph S. Tripoli; Eric P. Herrmann; James B. Hayes

[57] ABSTRACT

A picture-in-a-picture television receiver displays a compound image which includes a compressed image derived from an auxiliary signal inset in a full-size image derived from a main signal. The auxiliary composite video signal is sampled synchronous with a system clock signal that is burst locked to the main signal. The sampled data signal is separated into luminance and color information component signals, which are subsampled and stored in a field memory synchronous with the system clock signal. The clock signal phase used for horizontal subsampling is determined at the start of each line to compensate for skew errors in the auxiliary signal. The luminance samples retrieved from the memory are applied to clock transfer circuitry which resynchronizes the samples to a phase shifted version of the system clock signal to compensate for skew errors in the main signal. The phase shifted clock signal is synchronized to the horizontal scanning signals used to display the compound image. The color information component signals are not resynchronized to the phase shifted clock signal. The component signals of the compressed image are combined to form a composite signal having color information that is synchronized to the main signal. The compressed signal is substituted for a portion of the main signal to generate a signal representing the compound image.

12 Claims, 6 Drawing Sheets

FIG. 3 SIGNAL PHASE ALIGNMENT CIRCUITRY 210

FIG. 5

METHOD AND APPARATUS FOR CORRECTING TIMING ERRORS AS FOR A MULTI-PICTURE DISPLAY

BACKGROUND OF THE INVENTION

This invention relates to apparatus and a method for reducing the visibility of timing errors in for example, the inset image of a picture-in-a-picture (pix-in-pix) television display system.

In a pix-in-pix system, two images from possibly unrelated sources are displayed simultaneously as one image. The compound image includes a full size main image with an inset compressed auxiliary image. The subjective quality of the inset image may be affected by timing errors in either the main signal or the auxiliary signal.

Timing errors relevant to the present invention may occur, for example, when either the main or auxiliary signal is a nonstandard signal. As used herein, the term nonstandard signal means a video signal having a horizontal line period which may vary in length relative to the horizontal line period set by the signal standard to which the video signal nominally conforms (e.g. NTSC, PAL or SECAM). A noisy but otherwise standard signal may appear to be a nonstandard signal if the noise is of sufficient amplitude to mask transitions of the horizontal line synchronization (horizontal sync) signal.

To understand how these timing errors may affect the inset image, it is helpful to know how the auxiliary signal is processed and displayed. In a conventional pix-in-pix display system, the auxiliary signal is sampled at instants determined by a sampling clock signal which, desirably, bears a fixed relationship to the horizontal line scanning frequency of the auxiliary signal. To aid demodulation of the chrominance signal components of color television signals, the sampling clock signal desirably has a frequency that is a multiple of the chrominance subcarrier frequency. If the multiple is an even number, e.g., 4, for standard signals, this is a suitable sampling signal since, under all major video signal standards, it produces an integer number of samples per line interval. Under the NTSC system, this sampling clock signal may be developed, for example, by a phase locked loop which produces a sampling signal having a frequency of 4$f_c$, four times the frequency, $f_c$, of the color subcarrier signal, and which is locked in phase to color reference burst component of the auxiliary composite video signal.

The auxiliary video signal is separated into its component parts, generally a luminance signal and two color difference signals. These component signals are then subsampled both horizontally and vertically to develop signals that represent a compressed image. The lines of samples taken during one field of the auxiliary signal are stored in a memory. These samples are read from the memory for display using a clock signal that is desirably related to the horizontal line scanning frequency of the main video signal.

When the auxiliary signal originates from a noisy source or from a nonstandard source such as a video tape recorder (VTR) or a video game, the frequency of the horizontal sync signal may appear to vary significantly from line to line while the frequency of the color subcarrier signal, and thus of the color reference burst signal, may seem relatively stable. This variation can be caused by pickup head misalignment or by stretched tape in a VTR or by inaccuracies in the frequencies used by video game circuitry. Since, in the example set forth above, the sampling clock signal is locked in phase to the color reference burst signal, corresponding samples on successive lines may be shifted or skewed relative to each other. When these lines of samples are displayed in synchronism with the main signal, the pixels produced by these corresponding samples may not line up vertically. Consequently, any vertical lines in the inset image may appear jagged (if the period of the horizontal sync signal changes randomly) or tilted (if there is a fixed error in the relative frequencies of the horizontal sync and color burst signals). The frequency and phase variations which cause this type of image distortion are known as timing errors or, alternatively, as skew errors.

One type of timing error, which is relevant to the present invention, results from frequency or phase variations between the main horizontal sync signal and a video display clock signal that is phase locked to the color reference burst component of the main signal. Errors of this type may randomly change the distance between the left side edge of the main image (defined by the horizontal sync pulses) and the beginning of lines of the inset image (defined by the display clock signal). Main signal timing errors of integral numbers of sampling clock periods may be compensated for in the phase locked loop circuitry which generates the horizontal sync signal. Skew errors which are a fraction of a sampling clock period may be more difficult to correct.

One method of correcting these types of timing errors is to use interpolation to develop sample values that are matched to the clock signal used to store or display them. Another method is to shift the phase of the clock signal used to display the sample values so that it is properly aligned to the horizontal sync signal. These methods are described in U.S. Pat. No. 4,638,360 entitled "Timing Correction for a Picture-In-Picture Television System" which is hereby incorporated by reference.

Skew errors may also be corrected by generating samples that represent component video signals in synchronism with a skew shifted line locked clock signal. These samples are then applied to clock transfer circuitry which aligns the samples with a line-locked clock signal that is not skew shifted. U.S. Pat. No. 4,782,391 entitled "Multiple Input Digital Video Features Processor for TV Signals," which is hereby incorporated by reference, relates to a system of this type.

The first two methods described above use two substantially independent clock signals. Aside from the extra circuitry used to generate an additional clock signal, systems which use multiple clock signals may need to be carefully shielded to prevent radio-frequency interference between the signals.

In the third method described above, the luminance and color difference signal components of the auxiliary signal are separated by analog circuitry and then digitized. A system using this method may be more complex than a system which digitizes the composite video signal and then separates it into its component parts. In addition this second method uses line-locked clock signals, so it may be difficult to encode the color information signals of the compressed video signal so that the two signals may be time-division multiplexed for display.

SUMMARY OF THE INVENTION

The present invention is embodied in a system which compensates for timing errors in a first video signal relative to a second stored video signal. This system includes a first clock signal for retrieving samples of the second stored video signal from memory. A signal phase alignment circuit shifts the phase of the first clock signal to generate a second clock signal that is synchronized to the horizontal scanning signal derived from the first video signal. A clock transfer circuit, responsive to the second clock signal, aligns retrieved sample synchronous with the first clock signal, to a predetermined phase relationship with the phase shifted clock signal.

DETAILED DESCRIPTION

The present invention is described in the context of digital circuitry which implements, for example, a pix-in-pix feature for a consumer television receiver. It is contemplated, however, that this invention has broader application. It may be used in other systems where two images or portions of two images are displayed concurrently (e.g., side by side or one over the other) and it may employ analog circuitry, such as charge-coupled devices, in place of the digital memory circuitry.

THEORY OF OPERATION

In the television system described below, a main video signal is processed by conventional analog circuitry to produce a full-size image. An auxiliary signal is received, digitized and processed by digital circuitry to produce a luminance signal and two quadrature phase related color difference signals. These separated signals are subsampled to develop signals representing a compressed image. The subsampled signals are stored in a memory which holds one field interval of the compressed signal. When the compressed image is to be displayed, the stored signals are retrieved from the memory and encoded into a composite video signal. This composite video signal is substituted for a portion of the main composite video signal to generate a compound signal which is processed by the analog circuitry to display a compound image. This compound image includes a full-size main image with a compressed auxiliary image displayed as an inset.

A composite video signal includes three component signals, a luminance signal, Y, and two color difference signals, for example, (R-Y) and (B-Y). The two color difference signals modulate respective quadrature phase related color subcarrier signals to produce a chrominance signal which is additively combined with the baseband luminance signal to generate the composite video signal. Conventional analog techniques for decoding a composite video signal include low-pass filtering to recover the luminance signal, Y, and band-pass filtering to recover the chrominance band signals. The chrominance band signals are then synchronously demodulated using a regenerated color subcarrier signal.

In general, when digital processing techniques are used, a composite video signal is first sampled and digitized. The sampling clock signal used to develop these samples is typically locked in phase to the color burst signal of the composite video signal. This sampling signal may aid in the demodulation of the chrominance signal. For example, if the selected sampling clock signal has a frequency of 4fc, four times the frequency, fc, of the color subcarrier signal, successive samples of the separated chrominance signal may be represented by the sequence (R-Y), (B-Y), -(R-Y), -(B-Y), (R-Y), etc. where the minus signs indicate sampling phase and not necessarily sample polarity. The (R-Y) and (B-Y) color difference signals may be recovered from this sequence by a process of demultiplexing and selective polarity inversion.

Thus, if these conventional techniques are used to decode the chrominance signal components of two independent composite video signals, it is desirable to generate two oscillatory signals related to the respective color subcarrier signals of the two composite video signals. Using two clock signals may complicate the design of the receiver, since electromagnetic shielding may be needed, to limit interference between the two signals.

An alternative method for demodulating two video signals is to generate only one oscillatory signal, for example, the main signal color subcarrier signal. This signal is then used to generate a sampling clock signal for digital circuitry which processes the auxiliary signal. However, since the chrominance signal phases of the main and auxiliary signals may be different, it may be desirable to include circuitry which corrects the phase of the digitized decoded color difference samples based on the color reference burst component of the auxiliary signal.

The choice of a sampling clock signal is also a factor in determining what type of skew-error compensation circuitry is to be used in the system. Since a clock signal that is locked to the main burst signal may be less closely aligned to the auxiliary horizontal sync signal than a clock signal that is locked to the auxiliary burst, the possibility of skew errors when the compressed auxiliary signal is stored in the memory is increased. Moreover, if the sampling clock signal is locked to the main signal burst, skew errors caused by noise in the main signal or by variations in the relative frequencies of the main signal horizontal sync and color subcarrier signals are not reduced. A sampling clock signal that is locked to the horizontal synchronizing component of the auxiliary signal may also be used.

In the television receiver described below, skew errors of the first type are reduced to a maximum of one-third of one clock period (e.g. to a maximum of 23 ns for a sampled data NTSC signal having a sampling frequency of 4fc) and skew errors of the second type are substantially eliminated.

In the system described below, the luminance signal component of each horizontal line interval of the auxiliary video signal is subsampled in a six to one ratio and then displayed at a sample rate that is one-half of the 4fc sampling clock signal derived from the main signal burst. This results in an effective sampling ratio of three to one. Thus, the effective subsampling clock signal has a frequency that is one-third of the frequency of the clock signal used to display the samples. When the subsampling clock signal is generated, signals having six different evenly spaced phases are provided. Skew errors of the first type are reduced by selecting the best one of these six possible subsampling clock signal phases at the start of each horizontal line of the auxiliary video signal. The selected phase is determined by the relative timing of each phase to the auxiliary horizontal sync signal.

Skew errors of the second type are substantially eliminated by using phase alignment circuitry to generate, from the main clock signal, a display clock signal that is aligned to signals which control the horizontal scanning of the display. A clock transfer circuit is then used to translate samples that are provided in synchronism with the main clock signals into samples that are synchronous with the display clock signal. Since the display clock signal is derived from the main clock signals, there is no distortion of the output samples caused by frequency differences between the two clock signals.

DESCRIPTION OF THE EXEMPLARY EMBODIMENT

In the drawings, broad arrows represent signal paths for conveying multi-bit digital signals. Line arrows represent connections for conveying analog signals or single-bit digital signals. Depending on the processing speed of the devices, compensating delays may be required in certain of the signal paths. One skilled in the art of digital signal processing circuit design will know where such delays are needed in a particular system.

Figure 1:
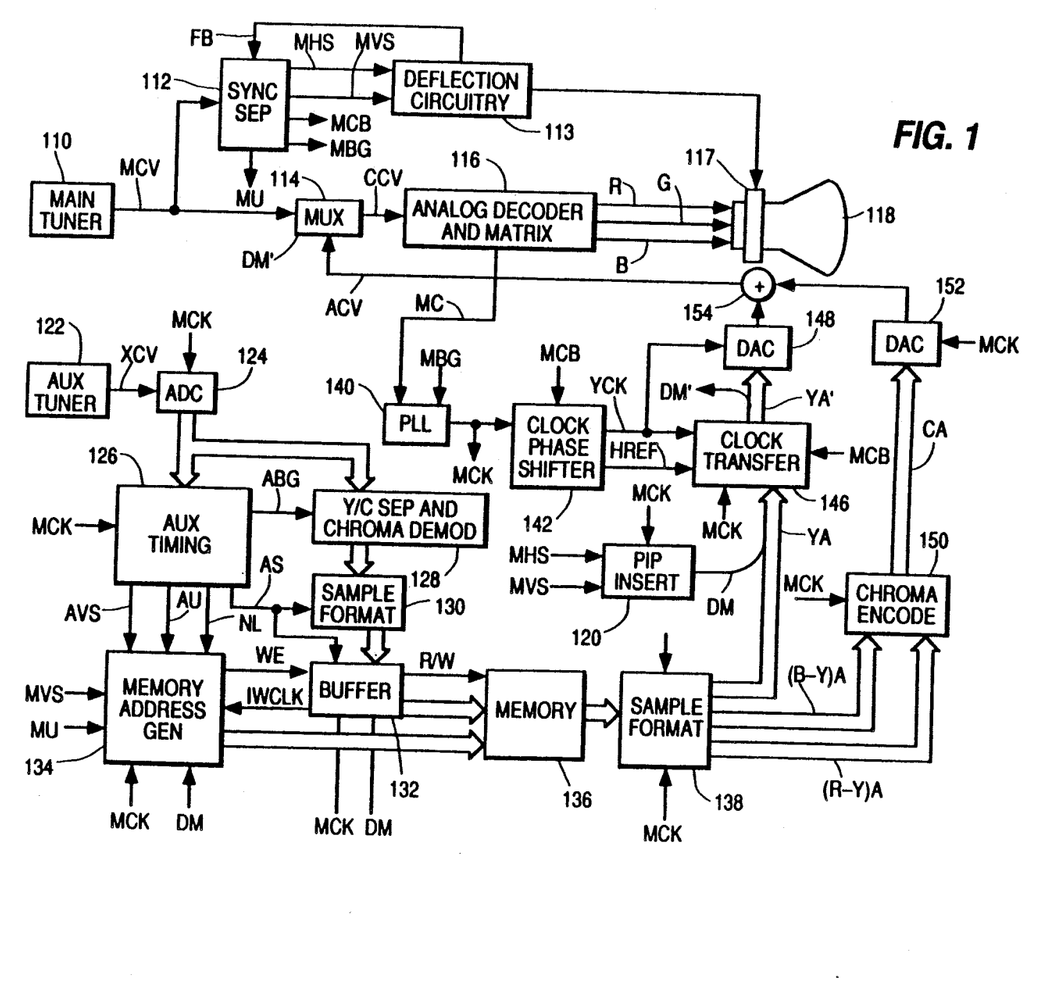
FIG. 1 is a block diagram of a television receiver which includes an embodiment of the present invention.

FIG. 1 is a block diagram of a television receiver having a pix-in-pix feature which includes an embodiment of the present, invention. In FIG. 1, a main composite video signal, MCV, provided by a main tuner 110 is applied to conventional synchronization signal separation circuitry 112. The circuitry 112 generates signals MHS and MVS representing, respectively, the horizontal line and vertical field synchronizing signal components of the signal MCV. The circuitry 112 also provides a main burst-gate signal, MBG, a signal MU which indicates when the signal MCV is the upper field of an image and a main composite blanking signal, MCB. The signal MCB is generated by phase locked loop circuitry which uses a horizontal fly-back signal, FB, generated by deflection circuitry 113, as a reference signal. Consequently, the signal MCB is locked to the horizontal line scanning signals used to produce the video display. It is relatively independent of noise in the signal MCV and tends to track variations in the scanning frequency related to the loading of the high-voltage supply.

The signal MCV is also applied to one input terminal of a multiplexer 114. Another input terminal of the multiplexer 114 is coupled to receive a composite video signal ACV representing a compressed auxiliary image. The multiplexer 114 is controlled by a signal, DM', to substitute the signal ACV for the signal MCV in a portion of each field. The signal DM' is generated by pix-in-pix insertion circuitry 120 and clock transfer circuitry 146 as described below. The compressed signal, ACV, is substituted for the main signal, MCV, when the signal DM' is logic-zero. The output signal of the multiplexer 114 is a compound composite video signal, CCV, representing the main image with an inset auxiliary image.

The pix-in-pix insertion circuitry 120 is responsive to the main horizontal and vertical synchronizing signals, MVS and MHS, and to a clock signal MCK to generate the signal DM. The signal DM is applied, as set forth below, to the clock transfer circuitry 146 to produce the signal DM' which is aligned to the horizontal scanning signal used to produce the compound display. In the present embodiment of the invention, the compressed auxiliary image is displayed during 69 successive line intervals during each field of the main signal. Each displayed compressed line occupies approximately one-quarter of the corresponding main signal horizontal line interval.

The output terminal of the multiplexer 114 is coupled to conventional analog decoder and matrix circuitry 116 which, for example, separates the luminance and chrominance signal components of the signal CCV, demodulates the chrominance signal component into quadrature phase related color difference signal components and generates, from the luminance and color difference signals, red (R), green (G) and blue (B) primary color signals for application to a cathode-ray tube (CRT) 118. The image represented by the signal CCV is reproduced on the CRT 118 under control of deflection signals generated by the deflection circuitry 113.

An auxiliary composite video signal, XCV, from which the signal ACV is generated, is provided by a conventional television tuner 122. The signal XCV is applied to an analog-to-digital converter 124 which is clocked by the sampling clock signal MCK. The signal MCK is generated by phase locked loop (PLL) circuitry 140. The circuitry 140, which may include a conventional burst-locked PLL is responsive to the main chrominance signal component, MC, provided, for example, by the analog decoder and matrix circuitry 116, and to the main burst-gate signal, MBG, to generate the clock signal MCK which has a frequency, 4fc, four times the frequency, fc, of the color subcarrier signal component of the signal MCV. The signal MCK is locked in phase to the color synchronizing burst signal component of the main signal MCV.

The color burst signal is a reference signal having a predetermined phase relationship with the color subcarrier signal component of a composite video signal. Thus, the ADC 124 produces samples of the auxiliary signal, XCV, that are synchronized to the chrominance subcarrier signal component of the main signal, MCV.

The samples provided by the ADC 124 are applied to auxiliary timing circuitry 126 which, responsive to the signal MCK, generates signals AVS, ABG, AU, AS and NL. The signal AVS is the vertical field synchronizing signal for the auxiliary video signal. The signal ABG is the auxiliary burst-gate signal. The signal AU indicates when the auxiliary samples are from an upper field or from a lower field. The signals AS and NL are pulse signals that indicate which pixels and lines, respectively, of the auxiliary signal may be used to form the compressed image. These signals eliminate several lines on the top and bottom of the image and several pixel positions on the left and right sides of the image. These portions of the image are eliminated to reduce the amount of memory used to store the image and to reduce the size of the inset in which the auxiliary image is displayed.

As set forth above, the subsampling signal AS is adjusted in phase at the start of each horizontal line period of the auxiliary signal. This phase adjustment effectively selects one of six phase shifted subsampling signals generated from the signal MCK. Using this adjustment, skew errors in the display caused by differences in the relative times of occurrence of the auxiliary horizontal sync pulse and the first stored pixel are limited to 23 ns [1/(12fc)]

Figure 1A:
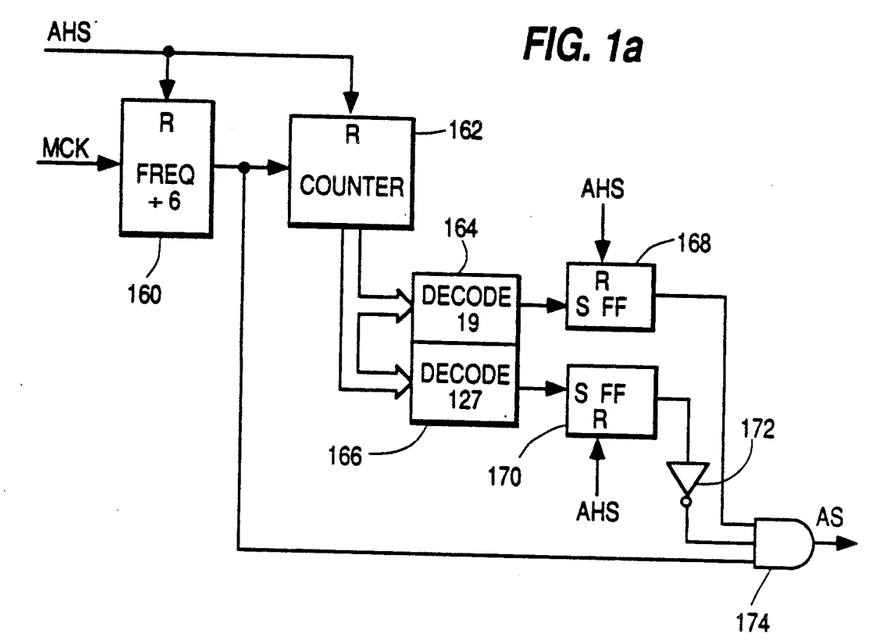
FIG. 1a is a block diagram of exemplary circuitry for generating a subsampling clock signal used in the television receiver shown in FIG. 1.

FIGURE 1a shows exemplary circuitry for generating the subsampling signal AS. This circuitry is a part of the auxiliary timing circuitry 126. In FIGURE 1a, the signal MCK is applied to a frequency divider 160 which is reset by the auxiliary horizontal sync signal, AHS. The output signal of the frequency divider 160, which has a frequency of 2fc/3, is applied to a seven-bit counter 162 which is reset by the signal AHS. The output signal of the counter 162 is coupled to first and second decoders 164 and 166. The decoders 164 and 166 produce logic-one output pulses when the value provided by the counter 162 is equal to 19 and 127, respectively. The values provided by the decoders 164 and 166 are used to set respective RS flip-flops 168 and 170. These flip-flops are reset by the signal AHS. The output signal of the flip-flop 168 and the inverted output signal of the flip-flop 170 enable an AND gate 174 to pass the signal provided by the frequency divider 160 during the central portion of each auxiliary line. Since the frequency divider 160 is reset at the start of each horizontal line period, the phase of the subsampling clock signal AS may vary from line to line to track the phase of the signal AHS.

The samples generated by the ADC 124 are applied to a luminance-chrominance (Y/C) separator and chrominance signal demodulator 128, which is also coupled to receive the signal ABG provided by the auxiliary timing circuitry 126. The Y/C separator portion of the circuitry 128 uses a standard low-pass and band-pass filter arrangement to separate luminance signal and chrominance-band signals from the auxiliary composite video signal. The chrominance signal demodulator portion of this circuitry separates the chrominance band signal into two quadrature phase related color difference signals, for example, (R-Y) and (B-Y).

Since the signal XCV is sampled synchronous with the color subcarrier signal of the main signal, the color difference samples provided by the circuitry 128 may need to be shifted in phase to correct for phase differences between the color subcarrier signals of the main and auxiliary video signals. To this end, the circuitry 128 is coupled to receive the auxiliary burst-gate signal, ABG, provided by the timing circuitry 126. Responsive to this signal, the circuitry 128 monitors the color burst signal component of the sampled data auxiliary signal and corrects the phase of the demodulated color difference signals on a line-by-line basis. Exemplary circuitry for performing this function is described in U.S. Pat. No. 4,558,348.

The output signal from the Y/C separator and chrominance demodulator 128 is applied to a sample formatter 130. The formatter 130 is responsive to the signal AS to horizontally subsample the sampled data luminance signal in a six to one ratio and to subsample each of the sampled data color difference signals to produce respective compressed color difference signals having a sampling frequency of fc/9 (4fc/36). This horizontal subsampling compresses the auxiliary image in a three-to-one ratio when the luminance signal is displayed at a sample rate of 2fc and the color difference signals are displayed at an effective sampling rate of fc/3.

Using this subsampling scheme, one pair of samples, representing the two color difference signals, is produced for each six luminance samples. The formatter 130 reduces each of the luminance and color difference samples to six bits of significance and combines the luminance and color difference samples such that six bits of each eight-bit output sample represent luminance information and the remaining two bits represent one bit each of two corresponding color difference signal samples. This technique spreads each pair of color difference samples across six consecutive luminance samples. The sample formatter 130 provides these eight-bit samples to a buffer 132.

Samples provided to the buffer 132 are stored in a first-in-first-out (FIFO) memory (not shown) which is internal to the buffer 132. The stored samples are transferred from the buffer 132 to a memory 136 under control of memory address generation circuitry 134. The circuitry 134 also controls the reading of samples from the memory 136 for display. In writing samples into the memory 136, the circuitry 134 vertically subsamples the horizontally subsampled auxiliary signal to generate samples representing a vertically and horizontally compressed image. The memory 136 used in this embodiment of the invention includes a sufficient number of storage cells to hold one field of samples of the compressed image.

Samples are read from the memory 136 at a 2fc rate responsive to the address signals provided by the memory address generator 134. These samples are processed by the circuitry described below to generate the composite video signal ACV which is combined with the signal MCV, as set forth above, to generate the compound pix-in-pix image.

The samples read from the memory 136 are applied to a sample formatter 138. The formatter 138 reverses the process performed by the formatter 130, to provide a separate luminance signal and two separate color difference signals, each occurring at a 4fc sample rate. However, in this embodiment of the invention, the luminance samples change value at a maximum rate of 2fc and the color difference samples change at a rate of fc/3. The sampled data (R-Y) and (B-Y) color difference signals are applied to a chrominance signal encoder 150 which interleaves, interpolates and selectively inverts the color difference samples to generate a sampled data chrominance signal. The effective color subcarrier signal of this sampled data chrominance signal has the same frequency and phase as the color subcarrier of the signal MCV since the clock signal, MCK, used by the encoder 150 is burst-locked to the main signal.

The sampled data luminance signal, YA, provided by the formatter 138 and the signal DM provided by the pix-in-pix insertion circuitry 120 are applied to the clock transfer circuitry 146. The circuitry 146, described below in reference to FIG. 4, changes the timing of its input signals to generate signals YA' and DM' which are synchronous with the clock signal YCK.

The signal YCK is phase aligned to horizontal synchronizing signal components of the main composite signal. Clock phase shifting circuitry 142, described below in reference to FIGS. 2 and 3, generates the clock signal YCK by providing multiple phases of the signal MCK and then selecting one of these phases as the signal YCK. The selected phase is the one most closely aligned to a horizontal line scanning reference signal derived from the signal MCB.

The signal CA, provided by the chrominance signal encoder 150, is not aligned to the signal YCK. This preserves the alignment of the chrominance signals of the compressed and main video signals. While the lack of alignment may cause skew errors in the color signals used in the compressed image, these errors are not noticeable since the human eye is less sensitive to changes in color than to changes in luminance and since the minimum rise time of a chrominance signal is much longer than for a luminance signal.

The signals YA' and CA are applied to respective digital-to-analog converters 148 and 152 which generate analog signals corresponding to the respective sampled data digital signals. These analog signals are combined in summing circuitry 154 to generate the analog composite video signal ACV which is substituted for a portion of the main signal MCV to generate the compound composite video signal, CCV.

Instead of multiplexing the signals MCV and ACV to develop signals representing the compound image, it is contemplated that circuitry may be inserted in the analog decoder 116 to multiplex the signals YA' and CA with respective separated main luminance and chrominance signals. Moreover, it is contemplated that other component signals such as YA' and (R-Y)A and (B-Y)A or auxiliary R, G, and B primary color signals may be multiplexed with corresponding signals derived from the main video signal to generate signals representing the compound image.

Figure 2:
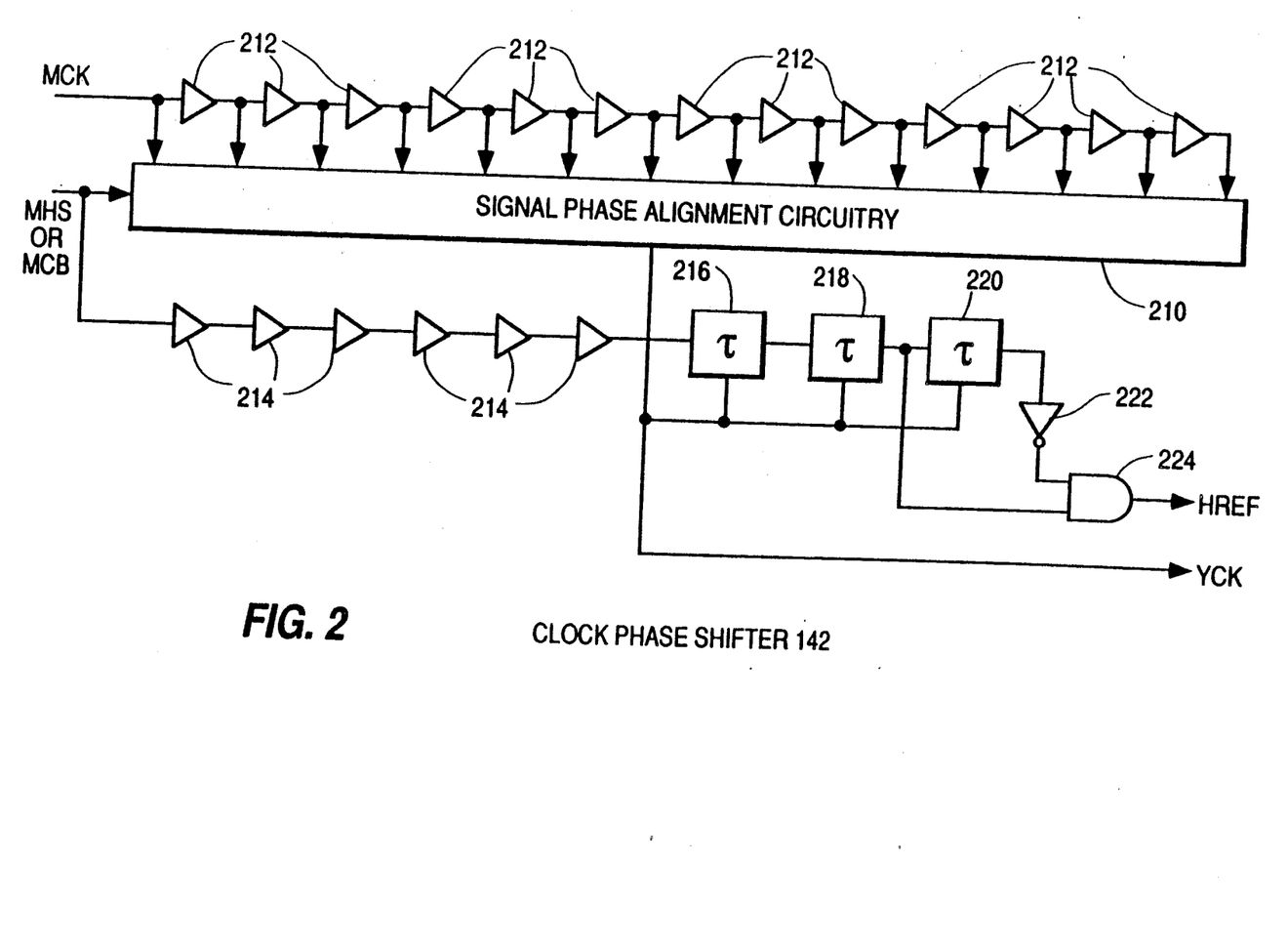
FIG. 2 is a block diagram of a clock phase shifter suitable for use in the television receiver shown in FIG. 1.

FIG. 2 is a block diagram of circuitry suitable for use as the clock phase shifter 142. In FIG. 2, the main clock signal MCK is applied to a set of 13 cascade-connected buffer gates 212. In this embodiment of the invention, each of the gates 212 is realized as a pair of logical inverters. Each of the buffer gates 212 delays the signal applied to its input port by a fixed amount of time. Thus, the output signals provided by the inverters 212 represent respectively different phases of the signal MCK. Ideally, the total delay through all of the serially connected buffer gates 212 is substantially equal to one period of the signal MCK. However, due to process variations in the manufacture of integrated circuits containing the clock phase shifter 142, variations in the total delay may vary by as much as $-50\%$ to $+100\%$.

The signals representing 14 different phases of the signal MCK, provided by the buffers 212, are applied to signal phase alignment circuitry 210. The circuitry 210 selects one of these signals as being the most closely aligned in phase to the horizontal scanning component of the main composite blanking signal MCB. The signal MCB is applied as a reference signal to the circuitry 210.

Figure 3:
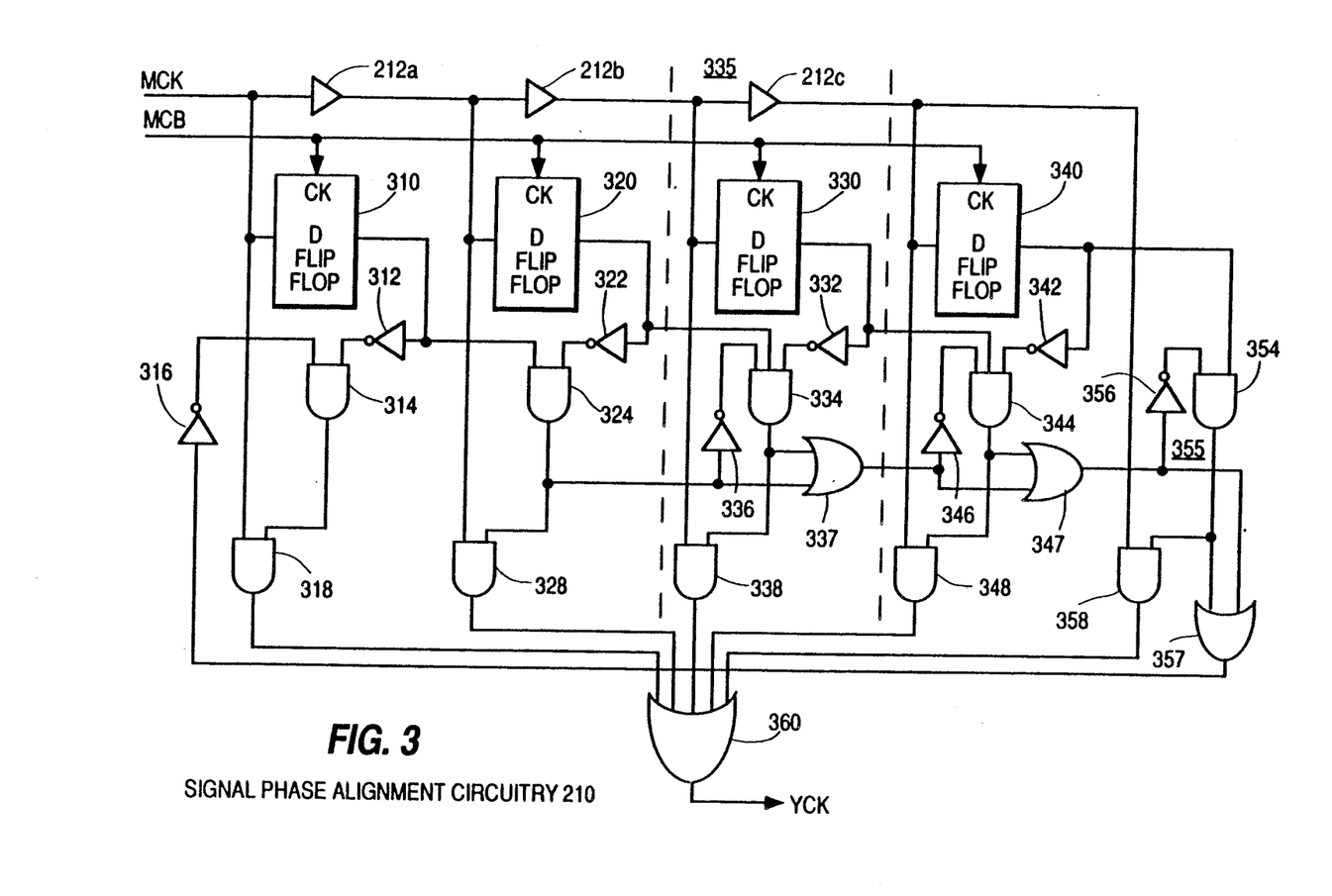
FIG. 3 is a block diagram of circuitry which illustrates the operation of the signal phase alignment circuitry shown in FIG. 2.

FIG. 3 is a block diagram of simplified phase alignment circuitry which illustrates the operation of the circuitry 210. This circuitry includes only four stages instead of the 14 stages of the circuitry 210. To add additional stages to this signal phase alignment circuitry, the elements delimited by the broken lines 335 are replicated as many times as desired. The circuitry shown in FIG. 3 is similar to circuitry described in U.S. Pat. No. 4,824,879 entitled, "Signal Phase Alignment Circuitry," which is hereby incorporated by reference. The present circuitry differs from the referenced circuitry only in the addition of a pseudo-stage 355 which includes AND gates 354 and 358, an inverter 356 and an OR gate 357.

The circuitry shown in FIG. 3 operates as follows. Responsive to a positive-going transition of the signal MCB, instantaneous samples of each of the different phases of the signal MCK are stored in respective D-type flip-flops 310, 320, 330 and 340. Since the total delay provided by the buffer gates 212 approximates one period of the clock signal MCK, the values stored in these flip-flops represent a "snapshot" of all of the phases of the signal MCK at the different taps, taken at the transition of the signal MCB.

If this "snapshot" includes a positive-going transition of the signal MCK (which appears as a negative-going transition of the samples from the delay line when read from left to right), one of the flip-flops, for example, 320 will have a logic-one output signal and the next successive flip-flop, 330 will have a logic-zero output signal. In this instance, all of the input signals to an AND gate 334 will be logic-one. In this instance, the output signal of the AND gate 334 will enable the clock phase signal provided by a buffer gate 212b to pass through an AND gate 338 and an OR gate 360 as the output signal of the phase alignment circuitry.

When the "snapshot" stored in the flip-flops 310, 320, 330 and 340 includes more than one transition, inhibiting circuitry which includes inverters 316, 336, 346 and 356 as well as OR gates 337, 347 and 357 allows only the clock signal phase corresponding to the first transition to be selected as the signal YCK. When the "snapshot" includes only a negative-going transition, or when the sample values held in the flip-flops are all logic-one, indicating no captured transition, the clock signal phase provided by the buffer gate 212c is selected as the phase aligned output signal YCK. This selection is accomplished by the pseudo-stage 355. Finally, when the "snapshot" does not include any transitions but the values held in the various flip-flops are all logic-zero, the signal MCK is selected as the phase aligned output signal, YCK, by the action of AND gates 314 and 318 and an inverter 316.

Referring to FIG. 2, the signal YCK is applied to the clock input terminals of three serially connected delay elements 216, 218 and 220. The data input signal to the first of these delay stages, 216, is the signal MCB as delayed by six buffer gates 214. The buffer gates 214 delay the signal MCB by an amount of time equal to the propagation delay through the signal phase alignment circuitry 210 plus an amount of time needed for the output signal of the circuitry 210 to become stable. This stabilizing time may be equal, for example, to the maximum signal propagation delay through the inhibiting circuitry. The six buffer gates 214 shown in FIG. 2 are exemplary. The exact number used depends on the number of stages in the alignment circuitry 210 as well as the technology in which it is implemented.

The delay elements 216, 218 and 220 each delay the signals applied to their respective input ports by one period of the signal YCK. The output signal of the delay element 218 and an inverted version of the output signal of the delay element 220 are applied to respective input terminals of an AND gate 224. The AND gate 224 provides an output signal HREF which is synchronized to the signal YCK but is delayed with respect to the signal MCB by an amount of time that is fixed to within the resolution of the signal phase alignment circuitry 210. That is to say, transitions of the signal HREF occur with a substantially fixed delay with respect to corresponding transitions of the signal MCB. The maximum error in this delay is the signal propagation delay time through one of the buffer gates 212.

Figure 4:
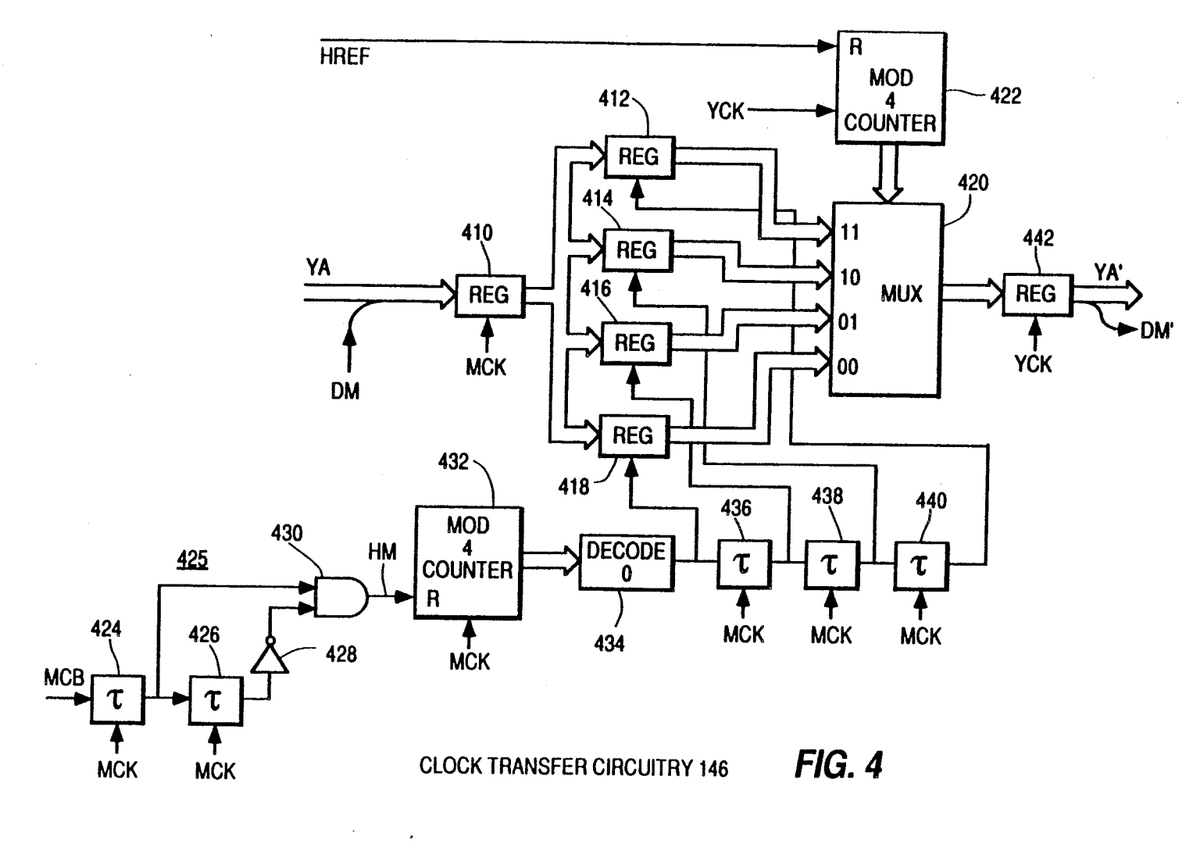
FIG. 4 is a block diagram of clock transfer circuitry suitable for use in the television receiver shown in FIG. 1.

As shown in FIG. 1, the signals YCK and HREF are applied to clock transfer circuitry 146 to align the signal DM and the samples of the signal YA to the horizontal line scanning signals that are used to display the compound signal. FIG. 4 is a block diagram of exemplary clock transfer circuitry 146. In overview, the circuitry shown in FIG. 4 operates as follows. Samples of the signal YA are transferred from a register 410 into registers 418, 416, 414, and 412 on a rotating basis synchronous with the main clock signal, MCK. Sample values are read from the registers 418, 416, 414 and 412, also on a rotating basis, synchronous with the signal YCK. These sample values constitute the signals DM' and YA'.

The following is a more detailed description of the circuitry shown in FIG. 4. The signal MCB is applied to an edge detector 425 which includes clocked delay elements 424 and 426, an inverter 428 and an AND gate 430. The output signal of the edge detector 425 is a pulse signal, HM, that is synchronized with a positive-going transition of the signal MCB. The signal HM is applied to the reset input terminal of a modulo-four counter 432. The clock input terminal of the counter 432 is coupled to receive the main clock signal, MCK. The output signal of the counter 432 is applied to a decoder 434. The decoder 434 produces a logic-one output signal when the value provided by the counter 432 is zero and a logic-zero output signal otherwise.

The output signal of the decoder 434 is a pulse which occurs once every four periods of the signal MCK and has a pulse width substantially equal to one period of the signal MCK. This signal is applied to three serially connected delay elements 436, 438 and 440. Each of these delay elements delays the signals applied to its input port by one period of its clock signal MCK. The output signals of the decoder 434 and the delay elements 436, 438, and 440 are applied to respective load input terminals of the registers 418, 416, 414, and 412.

Responsive to the pulse signal provided by the decoder 434, the register 418 is conditioned to load a sample value of the combined signals YA and DM from the register 410. During the next period of the signal MCK, the pulse signal propagates to the output terminal of the delay element 436. Responsive to this signal, the register 416 is conditioned to load the next subsequent sample of the signals YA and DM from the register 410. In the same way, the registers 414 and 412 are conditioned to load the next two respective samples of the combined signal YA and DM.

Sample values are read from the registers 412, 414, 416 and 418 under control of a modulo four counter 422. The counter 422 is reset by the signal HREF and clocked by the signal YCK. The output values provided by the counter 422 are applied to a multiplexer 420 to sequentially gate the values held in the registers 418, 416, 414 and 412 to the input port of a register 442. The register 442 is responsive to the signal YCK to load a new value. The output signal provided by the register 442 is the aligned and compressed luminance signal, YA'. Although this signal is provided for each horizontal line interval in each field of the main video signal, it is only valid during the portion of the 69 line intervals in which the compressed image is displayed.

Figure 5:
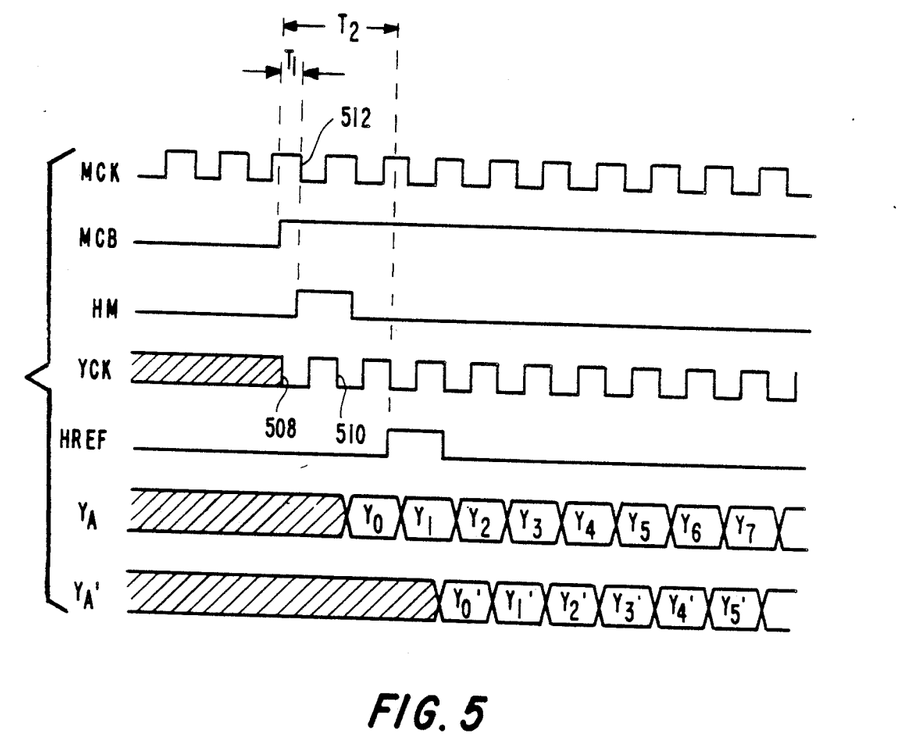
FIG. 5 is a timing diagram which is useful for describing the operation of the clock phase shifter circuitry shown in FIG. 2.

FIG. 5 is a timing diagram which illustrates the operation of the clock phase shifter 142 and the clock transfer circuitry 146. The signals MCK and MCB are applied to the clock phase shifter 142. The skew error between the exemplary signals MCK and MCB is illustrated as the time interval T1. In this embodiment of the invention, the time interval T1 may have values ranging from 0 ns to 70 ns.

Responsive to the signals MCK and MCB, the clock phase shifter 142 generates the clock signal YCK that is aligned to the signal MCB and thus to the horizontal line scanning signals used to display the compound image on the CRT 118. The negative-going transition 510 of the signal YCK is in a substantially fixed time relationship with the positive going transition of the signal MCB. The time interval between these two transitions may vary, from line to line, by the propagation delay through one of the buffer gates 212. The transition 508 of the signal YCK is nominally aligned with the positive-going transition of the signal MCB, but, due to propagation delays through the gating circuitry of the phase alignment circuitry 142 and through the inhibiting circuitry of the signal phase alignment circuitry 210, the transition 508 may not occur in the same time relationship with the signal MCB from line to line.

The buffer gates 214 are included in the phase shifter 142 to compensate for this instability in the transition 508. These gates prevent the signal MCB from propagating to the delay element 216 until the clock signal YCK has stabilized. The signal HREF, which is generated by the clock phase shifter 142 from the delayed signal MCB, and the clock signal YCK also have substantially fixed timing relationships with the signal MCB. The time interval T2 between the positive going transitions of the signals MCB and HREF varies by, at most, the propagation delay through one of the buffer gates 212. In this embodiment of the invention, that propagation delay is approximately 5 ns.

The signals MCK, MCB, YCK, HREF and YA are applied to the clock transfer circuitry 146. The output signal of the circuitry 146 is the phase aligned luminance signal YA' and the phase aligned control signal for the multiplexer 114, DM'. The signal HM is generated internal to the clock transfer circuitry 146. This signal begins the storage of sample values of the signal YA into the registers 412, 414, 416 and 418. The signal HREF begins the retrieval of sample values from these registers. As shown in FIG. 5, the signal HREF is delayed by more than one period of the signal MCK relative to the signal HM. This delay ensures that the sample values stored in the registers 412, 414, 416 and 418 are valid when they are read under control of the counter 422. In this embodiment of the invention this one clock period delay between the signals HREF and HM is provided by the delay element 436 of the clock transfer circuitry shown in FIG. 4.

Since the signals HREF and YCK are aligned with the horizontal scanning signals used to produce the compound display, vertical lines in the inset image, including the image borders, are displayed with significantly less skew error than if the signals HM and MCK were used. The skew errors related to the sampling of the auxiliary signal synchronous with the signal MCK are apparent only on vertical or near-vertical lines in the image. These errors are generally less noticeable than skew errors in the border of the compressed image which are caused, primarily, by instantaneous phase differences between the system clock signal and the horizontal scanning signals.

While the invention has been described in terms of an exemplary embodiment, it is contemplated that it may be practiced as outlined above with modifications within the spirit and scope of the appended claims. For example if the invention is practiced in the environment of a video cassette recorder (VCR), blanking signals are nominally unavailable. In this instance signals derived from the vertical and horizontal synchronizing signals MHS and MVS will be utilized instead of the signal MCB. It is also contemplated that auxiliary input signal may be in component form obviating the circuitry 128. Further, a system may be arranged to combine main and auxiliary baseband luminance and chrominance components at multiplexer 114 in which case the main clock signal may be derived from a source other than the main video color reference burst signal, i.e., from the color reference signal of the auxiliary signal or the auxiliary horizontal synchronizing signal, etc. In a system for displaying two images side-by-side, the subsampling and interpolation elements of the exemplary system may be eliminated, and/or the sample formatting elements may be eliminated with the component signals stored in separate portions of the memory.

It should also be appreciated that in an arrangement where the auxiliary image is not compressed for display, but possibly only cropped, as for a side-by-side display, the auxiliary signal may be sampled and stored in memory in composite form. After the signal is retrieved from memory it may thereafter be separated into component form for realignment of the luminance component and synchronization of the auxiliary chrominance subcarrier with the main video chrominance subcarrier.

What is claimed is:

1. In a video signal processing system including a source of main video signal having a horizontal line synchronizing signal component and including memory means for holding sampled data representing a second video signal, apparatus for processing the sampled data in synchronism with said main video signal comprising:
    means for providing a clock signal;
    means for retrieving said sampled data from said memory means in synchronism with said clock signal;
    means for shifting the phase of said clock signal to generate a phase shifted clock signal that is substantially aligned with said horizontal line synchronizing signal, and for generating a reference signal phase aligned to said phase shifted clock signal and representing a delayed version of said horizontal line synchronizing signal; and
    clock transfer means, responsive to said phase shifted clock signal and said reference signal, for providing said sampled data, retrieved from said memory means, in synchronism with said phase shifted clock signal.

2. The apparatus set forth in claim 1 wherein said clock phase shifting means includes:
    means, responsive to said clock signal for generating a plurality of clock phase signals wherein each of said plurality of clock phase signals has a respectively different phase relationship with said clock signal;
    means, responsive to a predetermined transition of said horizontal line synchronizing signal for storing sample values representing, respectively, the instantaneous states of said plurality of clock phase signals;
    combinatorial logic means, responsive to said instantaneous states of said plurality of clock phase signals, for selecting one of said plurality of clock phase signals having a transition which occurs substantially concurrently with said predetermined transition of said horizontal line synchronizing signal as said phase aligned clock signal, and for selecting a first predetermined one of said clock phase signals as said phase aligned clock signal when all of said stored sample values exhibit a first state and for selecting a second predetermined one of said clock phase signals as said phase aligned clock signal when all of said stored sample values exhibit a second state.

3. In a video signal processing system including a source of main video signal having a horizontal line synchronizing signal component and including memory means for holding sampled data representing a second video signal, apparatus for processing the sampled data in synchronism with said main video signal comprising:
    means for providing a clock signal;
    means for retrieving said sampled data from said memory means in synchronism with said clock signal;
    means, responsive to said clock signal for generating a plurality of clock phase signals wherein each of said plurality of clock phase signals has a respectively different phase relationship with said clock signal;
    signal phase alignment means, coupled to receive said horizontal line synchronizing signal, for selecting one of said plurality of phase signals having a transition which occurs substantially concurrently with said predetermined transition of said horizontal line synchronizing signal as said phase aligned clock signal;
    means for delaying said horizontal line synchronizing signal by an amount of time less than one period of said clock signal;
    means, responsive to said phase aligned clock signal and to said delayed horizontal line synchronizing signal, for generating a reference signal which is delayed by an amount of time substantially equal to a predetermined amount of time relative to the predetermined transition of said horizontal line synchronizing signal;
    clock transfer means, responsive to said phase shifted clock signal and said reference signal, for providing said sampled data, retrieved from said memory means, in synchronism with said phase shifted clock signal, 4. In a video signal processing system including a source of main video signal having a horizontal line synchronizing signal component and including memory means for holding sampled data representing a second video signal, apparatus for processing the sampled data in synchronism with said main video signal comprising:
    means for providing a clock signal;
    means for retrieving said sampled data from said memory means in synchronism with said clock signal;
    means, responsive to said clock signal for generating a plurality of clock phase signals wherein each of said plurality of clock phase signals has a respectively different phase relationship with said clock signal;
    means, responsive to one of said stored sample values exhibiting a first state and a next subsequent stored sample value exhibiting a second state for selecting the clock phase signal corresponding to said next subsequent sample value as said phase aligned clock signal;

means for selecting a first predetermined one of said clock phase signals as said phase aligned clock signal when all of said stored sample values have said first state and for selecting a second predetermined one of said clock phase signals as said phase aligned clock signal when all of said stored sample values have said second state; and clock transfer means, responsive to said phase shifted clock signal, for providing said sampled data, retrieved from said memory means, in synchronism with said phase shifted clock signal.

5. Apparatus for aligning a periodic signal to a reference signal to provide an aligned periodic signal, comprising:

means for generating from said periodic signal, a plurality of phase signals having respectively different phase relationships with said periodic signal;

means for storing a plurality of sample values representing, respectively, instantaneous values of said plurality of phase signals occurring coincident with a predetermined transition of said reference signal;

combinatorial logic means, responsive to said plurality of sample values for selecting one of said phase signals as said aligned periodic signal when the stored sample values indicate a transition in the selected phase signal occurring approximately coincident with the predetermined transition of said reference signal, and for selecting a first predetermined one of said phase signals as said aligned periodic signal when the stored sample values indicate no transition in any of the phase aligned signals occurring coincident with the predetermined transition of said reference signal.

6. In a video signal processing system for receiving first and second mutually independent video signals, wherein each of said first and second signals have respective horizontal line synchronizing signal components and color reference burst signal components, a method of aligning said second video signal to said first video signal comprising the steps of:

generating a clock signal which is locked in phase to the color reference burst signal component of said first video signal;

sampling said second video signal at instants determined by said clock signal to develop a sampled data signal representing said second video signal;

generating a subsampling clock signal having a frequency substantially equal to 1/N times the frequency of said clock signal and aligned in phase with the horizontal line synchronizing signal component of said second video signal;

subsampling said sampled data signal in a ratio of 1 to N responsive to said subsampling clock signal to generate a compressed signal;

storing said compressed signal in a memory;

retrieving said compressed signal from said memory synchronous with said clock signal;

generating a phase shifted version of said clock signal which is aligned in phase to the horizontal line synchronizing signal component of said first video signal; and synchronizing said retrieved samples to said phase shifted clock signal.

7. In a video signal processing system including a source of main video signal having a horizontal line synchronizing signal component and a reference burst signal component, including a source of auxiliary video signal having at least a horizontal line synchronizing component and a luminance component, apparatus for synchronizing said luminance component with said main video signal comprising:

means for generating a clock signal synchronized with said reference burst signal component of said main video signal;

means, responsive to said auxiliary video signal and said clock signal, for providing samples of said auxiliary video signal synchronous with said clock signal;

means responsive to said clock signal and the horizontal line synchronizing component of said auxiliary video signal for generating a subsampling clock signal aligned in phase with the horizontal line synchronizing component of said auxiliary video signal;

means, responsive to said subsampling clock signal, for subsampling said samples of said auxiliary video signal to provide subsampled auxiliary video signal;

means including memory means, coupled to said means for subsampling, for writing said subsampled auxiliary video signal to said memory means, and for reading said subsampled auxiliary video signal from said memory means synchronous with said clock signal;

means, responsive to said clock signal and the horizontal synchronizing signal component of said main video signal, for generating a phase shifted clock signal having transitions in a predetermined relationship with a transition of said horizontal synchronizing signal component of said main video signal; and transfer means, coupled to said memory means, for providing the luminance component of said auxiliary video signal samples read from said memory means synchronized with said phase shifted clock signal.

8. The apparatus set forth in claim 7 wherein said auxiliary video signal component further includes a reference burst signal component and chrominance signal components, and said apparatus further includes:

means coupled to said means for providing samples of said auxiliary video signal, for separating said luminance signal component and said chrominance signal component, and for demodulating said chrominance signal components;

means for coupling said separated luminance and demodulated chrominance signal components to said means for subsampling, 9. The apparatus set forth in claim 8 further including means coupled to said memory means and said transfer means for combining chrominance signal components read from said memory means with a luminance signal component provided by said transfer means.

10. The apparatus set forth in claim 9 wherein said means for combining chrominance signal components read from said memory means with a luminance signal provided by said transfer means includes means for modulating said demodulated chrominance signal components synchronous with said reference burst signal component of said main video signal.

11. The apparatus set forth in claim 7 wherein said means for generating a phase shifted clock signal includes:

means, responsive to said clock signal for generating a plurality of respectively delayed representations of said clock signal;

means, responsive to a predetermined transition of said horizontal line synchronizing signal for storing sample values representing, respectively, the instantaneous states of said plurality of clock phase signals;

combinatorial logic means, responsive to said instantaneous states of said plurality of clock phase signals, for selecting one of said plurality of clock phase signals having a transition which occurs substantially concurrently with said predetermined transition of said horizontal line synchronizing signal, as said phase aligned clock signal, and for selecting a first predetermined one of said clock phase signals as said phase aligned clock signal when all of said stored sample values exhibit a first state and for selecting a second predetermined one of said clock phase signals as said phase aligned clock signal when all of said stored sample values exhibit a second state.

12. The apparatus set forth in claim 7 further including:

means responsive to the horizontal line synchronizing signal of said main video signal for generating a multiplexing control signal;

means for synchronizing said multiplexing control signal with said phase aligned clock signal to generate a shifted control signal; and multiplexing means, responsive to said shifted control signal for substituting said luminance component of said auxiliary video signal provided by said transfer means for portions of said main video signal.

* * * * *

UNITED STATES PATENT AND TRADEMARK OFFICE
CERTIFICATE OF CORRECTION

PATENT NO. : 4,992,874

DATED : February 12, 1991

INVENTOR(S) : Donald H. Willis et al.

It is certified that error appears in the above-identified patent and that said Letters Patent is hereby corrected as shown below:

Col. 14, between lines 64 and 65 insert

--means, responsive to the predetermined transition of said horizontal line synchronizing signal for storing sample values representing, respectively, the instantaneous states of said plurality of clock phase signals;--.

Signed and Sealed this

Twenty-third Day of June, 1992

*Attest:*

DOUGLAS B. COMER

*Attesting Officer*   Acting Commissioner of Patents and Trademarks